Jan. 5, 1971  F. J. KOVAC ET AL  3,553,307
TREATMENT OF POLYESTER TIRE CORD
Original Filed June 22, 1964  3 Sheets-Sheet 1

INVENTORS
FREDERICK J. KOVAC
GROVER W. RYE

BY  J.B. Holden
ATTORNEY

INVENTORS
FREDERICK J. KOVAC
GROVER W. RYE 3,553,307
TREATMENT OF POLYESTER TIRE CORD
Frederick J. Kovac, Akron, and Grover W. Rye, Cuyahoga Falls, Ohio, assignors to The Goodyear Tire & Rubber Company, Akron, Ohio, a corporation of Ohio
Continuation of application Ser. No. 376,750, June 22, 1964. This application Apr. 24, 1968, Ser. No. 748,136
Int. Cl. D02g 3/48; D02j 1/22
U.S. Cl. 264—290         4 Claims

ABSTRACT OF THE DISCLOSURE

Treating polyester cord reinforcement for tires by subjecting the tire cord to a first stage of heat treatment at a temperature in excess of 440° F. and for a period of 30 to 70 seconds while stretching the cord from 2 to 10 percent of its original length, followed by a second stage of heat treatment at a temperature also in excess of 440° F., and preferably higher than the temperature of the first stage, with an exposure time of 30 to 70 seconds and with the cord being permitted to shrink by 30 to 50 percent of the amount that it was stretched in the first stage treatment. An improved tire cord results.

---

This is a continuation of application Ser. No. 376,750, filed June 22, 1964, now abandoned.

The foregoing abstract is not to be taken as limiting the invention of this application, and in order to understand the full nature and extent of the technical disclosure of this application, reference must be made to the accompaying drawings and the following detailed description.

This invention relates to improved polyester cord and cord fabric for the reinforcement of pneumatic tires, their preparation and a tire containing the same.

It is generally recognized that the cooler a pneumatic tire remains in use the longer its life will be, because high temperatures decrease the life of a tire. This invention relates to a polyester fabric and the method of processing it to minimize the heat generated when a tire containing it, is used.

It is well known in the art to process thermostretchable ply-reinforcing materials prior to incorporation in tires to optimize their various physical properties, such as tenacity and tire growth. It has now been found that the processing of polyester tire cord and cord fabric to bring out their best properties requires different processing conditions from those used for the processing of other thermostretchable reinforcing materials, and the processing of polyester tire cord and cord fabric can be controlled to minimize heat generating characteristics of the tire, as well as to give them tenacity and low tire growth. The heat generated by a tire is interrelated with its elongation and heat shrinkage, and it has been found that by maintaining the elongation measured at 2.0 grams per denier (referred to herein as g.p.d.) of a polyester tire cord between 6.5 and 9.0 percent and its heat shrinkage between 2.5 and 5.75 percent, the heat generation is kept below 35 units, a heretofore unobtainable result with polyester tire cord fabric.

According to this invention, polyester tire cord and cord fabric are treated to provide low heat generation in use, as well as other desirable properties. The reason the cord or fabric is treated is that the properties of thermostretchable materials, such as elongation, heat shrinkage and heat generation are time dependent. It is therefore advisable to process the polyester in the form of cord or fabric shortly prior to incorporation into a tire. This is most conveniently done by treatment of a spool of the cord or a fabric roll.

The polyester tire cord or fabric is processed on a multistage treating unit containing a series of time and temperature tension zones. Specifically, the cord or fabric is first subjected to an extremely high temperature in the range of 440 to 490° F. for a very short exposure time of 35 to 70 seconds, and during this heat treatment the cord or fabric is subjected to sufficient tension to stretch it substantially 2 to 10 percent. The cord or fabric is thereafter, as the next stage in a continuous process, subjected to a treatment at a temperature which is a minimum of ten degrees higher than that employed in the first stage—that is, 450 to 500° F., for a similar minimum time exposure of 35 to 70 seconds, during which the cord or fabric is allowed to shrink 30 to 50 percent of the stretch that has been applied in the first treatment stage. The cord or fabric is then cooled under sufficient tension to maintain the residual stretch of up to several percent.

The polyester to which the treatment is applied is essentially a linear terephthalate. It ordinarily is an alkylene terephthalate in which the alkylene group contains 2 to 6 or 8 carbon atoms, having an intrinsic viscosity in phenol/trichloroethane (60:40) at 30° C. in excess of 0.55, a tenacity in excess of 5.5 grams per denier, and a minimum melting point of 450° F. It may be an ester of cyclohexane dimethanol and terephthalic acid. As is known, the polyesters obtained from aromatic glycols, such as the linear polyester known as Kodel, have improved heat resistance and higher modulus due to the presence of ring structures in the linear molecule, and such polyesters, although more expensive than the polyethylene terephthalates, respond also effectively to the three-stage treatment here described.

The invention is further described in connection with the accompanying drawings which relate to the treatment of tire-cord fabric. Tire cord may be subjected to the same processing steps in suitable equipment.

Figure 1:
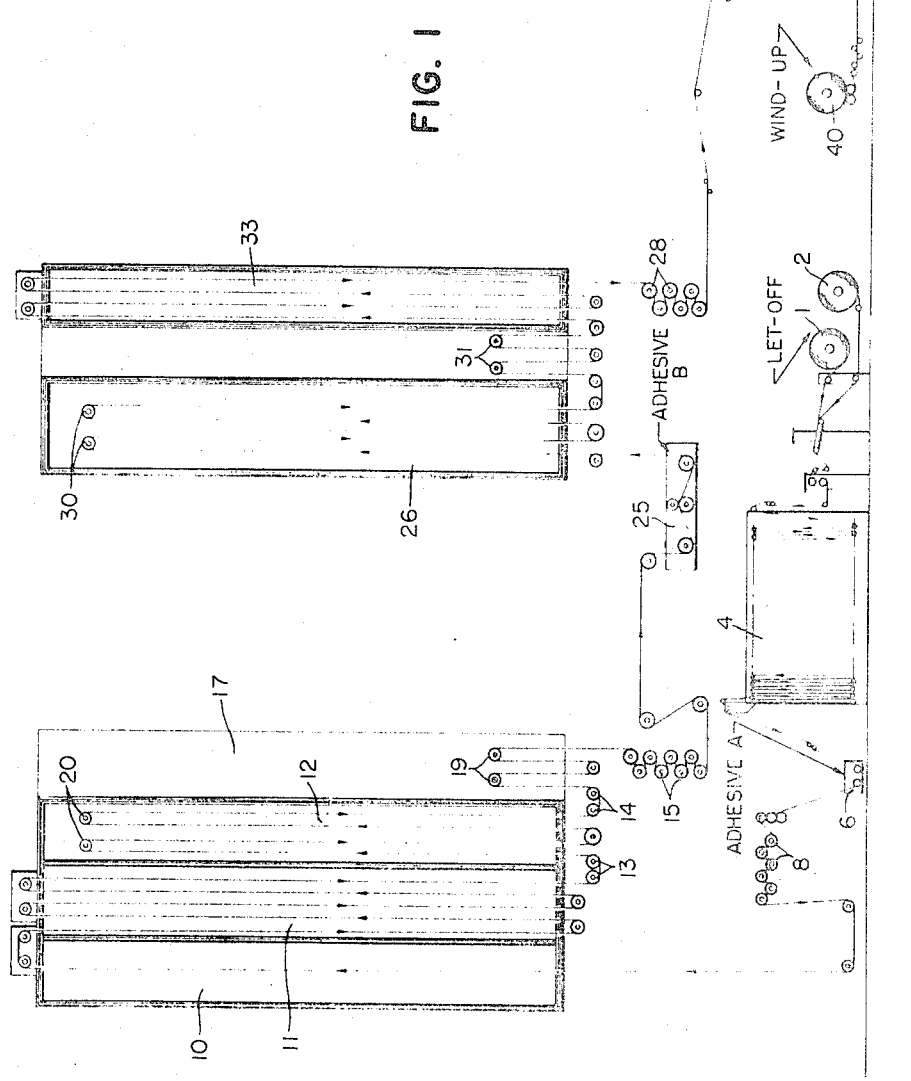
FIG. 1 is a schematic elevation of equipment for the multistage treatment of tire-cord fabric according to this invention.

Referring to FIG. 1, the treatment is here discussed as applied to a linear polyethylene terephthalate having an intrinsic viscosity of 0.65, a tenacity of 8.0 grams per denier and a melting point of 493° F. This polyester is produced in a size of 1100 denier yarn. Three of these yarns are twisted into 1100/3 cord. A roll of fabric is constructed from these cords. This fabric consists of 1540 cords across its width.

The fabric is withdrawn from one of the two rolls 1 and 2 and passed through a storage compensator 4 which insures a continuous flow of the fabric through the equipment. The fabric is then passed through the adhesive container 6 and then through the pull rolls 8. From here the fabric goes through a series of ovens the first oven 10 being a warm-up oven. The second oven 11 is a drying oven maintained at about 260 to 300° F., in which the moisture from the adhesive is removed from the fabric so that when the fabric reaches the first stage of the treatment to which this invention relates it is dry, or substantially dry. The time that the fabric remains in the third oven 12—that is, the time it takes for it to pass from the roll 13 to the roll 14—is 53 seconds. In the oven 12, the first stage of this process is carried out. The temperature is 460° F. The fabric between the set of tension rolls 8 and the set of tension rolls 15 is maintained under a tension sufficient to stretch the cords 5 percent. Usually this will be in the range of 4000 pounds or 2.6 pounds per cord. The chamber 17 is usually maintained at about room temperature. The rolls 19 in this chamber are connected through a chain and pulleys to the rolls 20 in the oven 12 so that the rolls 20 can be raised or lowered to maintain a particular residence time within the oven 12 and this is compensated for by moving the rolls 19 the same amount in the opposite direction. Such a device is known in the industry as a Rollevator.

The cord fabric then may or may not pass through a second adhesive chamber 25 and may or may not be dried. It then passes into the oven 26 where the second stage of the heat treatment of this invention takes place. This oven is maintained at a temperature of 470° F. The residence time within this chamber is substantially 53 seconds, the same as in the oven 12. The fabric is under less tension between the tension rolls 15 and the tension rolls 28 so that during the time the fabric is in this chamber 26 it shrinks 2 percent of the length at which it enters oven 26. The rolls 30 in this oven 26 are connected with the rolls 31 by a Rollevator. The latter rolls are not enclosed, and between the oven 26 and the cooling chamber 33 the fabric is exposed to atmospheric cooling.

The fabric then passes into the cooling chamber 33 and it eventually reaches substantially room temperature before passing through the rolls 28, after which it is no longer under tension. It then passes through another storage compensator 35 to the wind-up roll 40.

Although the fabric is under tension between the rolls 8 and 15, no substantial amount of stretching occurs until it reaches oven 12 where the high temperature plasticizes the polyester fabric sufficiently to permit this stretching. Similarly, in the second tensioning zone between the tensioning rolls 15 and 28, it is only in the oven 26, and shortly after, that the fabric is at a sufficiently high temperature to plasticize the fabric and allow it to shrink to any substantial extent.

The resulting fabric has a thermal shrinkage of substantially 3.4 percent and an elongation at 2 grams per denier of 8.0 percent. More generally, the invention pertains to a polyester tire cord fabric having a thermal shrinkage of 2.5 to 5.75 percent and an elongation at 2 grams per denier of 6.5 to 9.0 percent.

Figure 2:
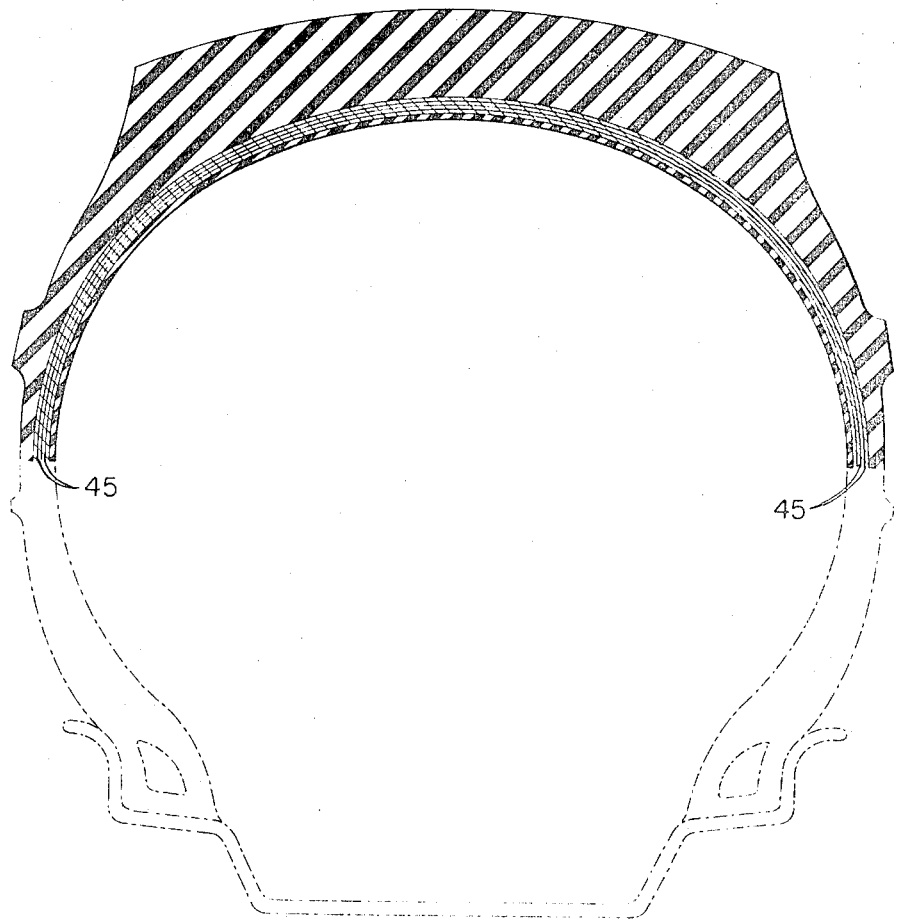
FIG. 2 is a section through the finished tire made from the treated cord.

The fabric after being treated in this manner is ready to be coated with rubber and built into a tire. FIG. 2 illustrates a typical tire. The reinforcing cords 45 in the fabric of the carcass plies are cords of the type which have been subjected to the treatment just described. These cords may be radial or incorporated in the tire on the bias. The fabric of the invention may be used elsewhere in the tire, according to any known or novel tire construction.

EXAMPLE I

This example is based on the treatment just described.

A 1100 denier polyester yarn was twisted into a 1100/3 cord construction and these cords were woven into a tire fabric having 28 ends per inch cord count. This polyester tire cord fabric was processed through a multi-stage unit such as illustrated in FIG. 1. This fabric was stretched 5 percent with an exposure of 53 seconds at a temperature of 460° F. followed by a shrinkage of 2 percent at an exposure of 53 seconds at a temperature of 470° F. The material processed in this manner has an elongation at 2.0 g.p.d. of 8.0 percent and a thermal shrinkage of 3.4 percent. Heat generation per unit stress cycle of the polyester cord material was found to be 25.2 at a test temperature of 200° F. which is a reduction of 30 percent below the heat generation of fabric of the same polyester which has not been processed by this invention. Tires built from this fabric and tested for tire durability (on standard equipment described below) ran 4,680 miles before failure, which is 62 percent better than tires built from polyester tire cord fabric processed outside the scope of this invention.

EXAMPLE II

A polyester tire fabric similar to that described in Example I was stretched 7 percent with an exposure of 35 seconds at 455° F., followed by a shrinkage of 3 percent at an exposure of 45 seconds at a temperature of 465° F. The fabric had an elongation at 2 g.p.d. of 7.5 percent and a thermal shrinkage of 3.8 percent. Heat generation of this fabric was found to be 29.5. Tires built from this fabric and tested for tire durability completed 3,890 miles prior to separation.

EXAMPLE III

A polyester fabric similar to that described in Example I was stretched 5 percent with an exposure of 35 seconds at 470° F., followed by shrinkage of 2 percent at an exposure of 35 seconds at a temperature of 480° F. Fabric properties showed elongation at 2.0 g.p.d. of 7.0 percent and a thermal shrinkage of 4.2 percent. Heat generation of this fabric was found to be 29.6. Tires built from this fabric and tested for durability completed 3,357 miles prior to failure.

Polyester tire cord fabrics were processed under a range of conditions both within and outside of the scope of this invention. The results are summarized in Table I. Fabrics A, B and C of the table were processed as described in the foregoing examples. Fabrics D and E were processed under different conditions detailed in the table. The conditions are outside of the scope of those set forth herein, and the properties are inferior. These results show the effect of subjecting the same polyester tire cord fabric to different treatments.

TABLE I.—POLYESTER TIRE CORD FABRIC

|  | A | B | C | D | E |
|---|---|---|---|---|---|
| First Stage: |  |  |  |  |  |
| Temperature (° F.) | 460 | 455 | 470 | 455 | 440 |
| Time (seconds) | 53 | 35 | 35 | 53 | 133 |
| Stretch (percent) | 5 | 7 | 5 | 5 | 5 |
| Second Stage: |  |  |  |  |  |
| Temperature (° F.) | 470 | 465 | 480 | 455 | 440 |
| Time (seconds) | 53 | 45 | 35 | 53 | 133 |
| Shrink (percent) | 2 | 3 | 2 | 1 | 1 |
| Thermal Shrinkage (percent)* | 3.4 | 3.3 | 4.2 | 5.8 | 2.3 |
| Heat generation | 25.2 | 29.5 | 29.6 | 36.0 | 42.1 |
| Elongation 2 g./denier (percent)* | 8.0 | 7.5 | 7.0 | 6.3 | 20 |
| Tire durability | 4,680 | 3,890 | 3,357 | 2,282 | 2,102 |

*ASTM Standards on Textile Materials: D885-62T (1963, 34th Ed.) Sect. 29 and 38.

Tire durability is determined by building the treated polyester into a tire and subsequently testing the tire by running it against a 67-inch Bureau of Standards dynamometer test wheel which has six cleats mounted across the face of the wheel. Each cleat is two inches wide by three-quarters inch high. The tire is tested at 2 pounds per square inch inflation pressure over the recommended inflation of the Tire & Rims Association and 120 percent of the load recommended by Tire & Rims Association. The mounted and inflated tire is run against and cleated test wheel at 45 m.p.h. until tire failure occurs.

Figure 4:
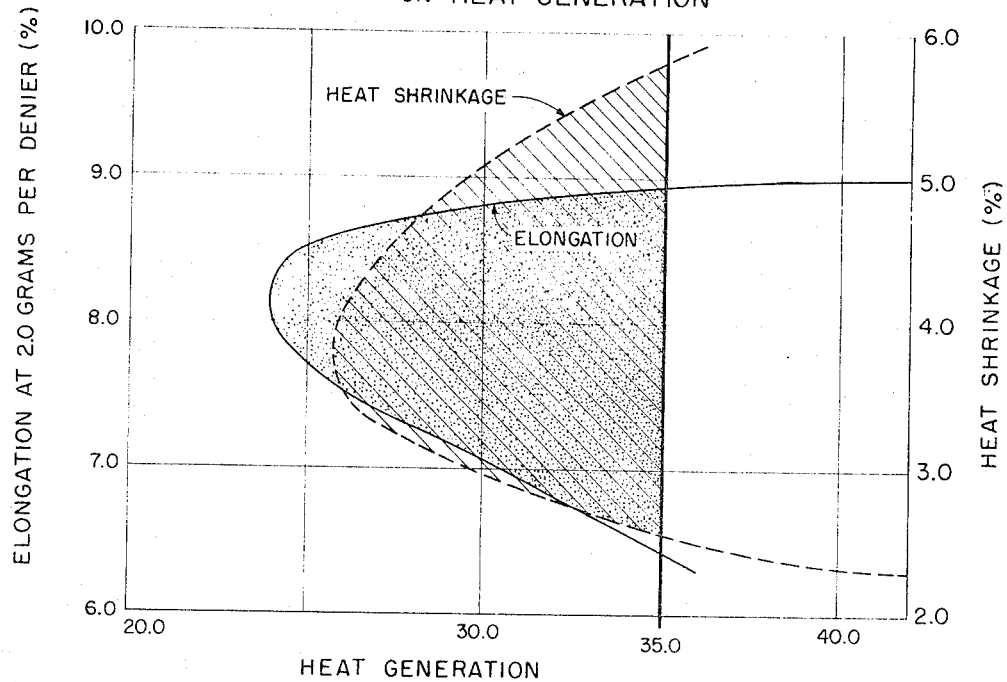
FIG. 4 is a graph which shows the interrelation of elongation, heat shrinkage and heat generation of polyester tire cord fabric.
Figure 3:
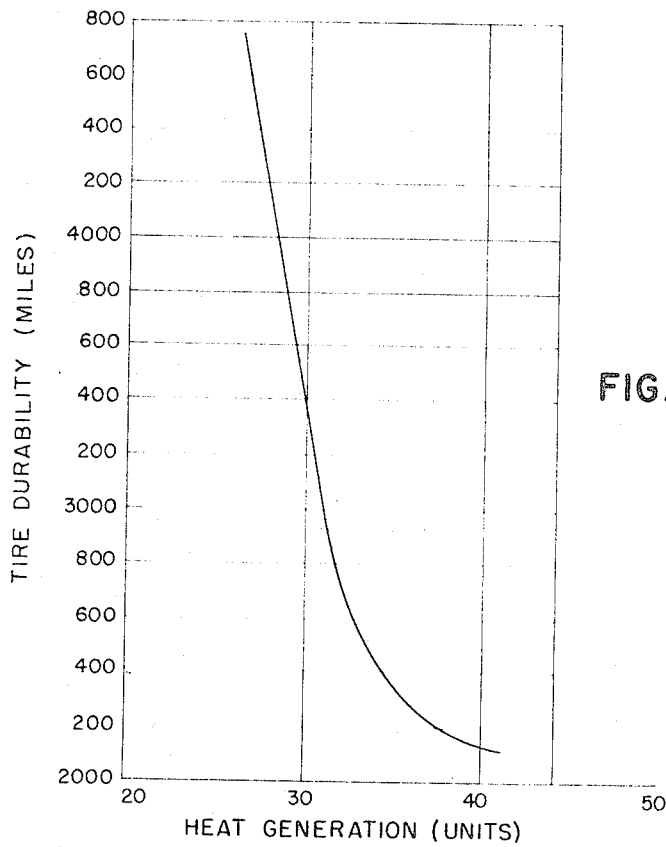
FIG. 3 is a graph showing the effect of heat generation on the durability of a tire reinforced with polyester cord fabric.

FIGS. 3 and 4 show the general relationship in a graphical manner between cord properties and tire performance.

The graph of FIG. 3 shows the effect of heat generation on the durability or life of a tire reinforced with polyester cord or polyester cord fabric. The cord or fabric for these tires was processed in such a manner as to vary their heat generation characteristics. As can be seen from the graph, heat generation in excess of 35 units causes a rapid decrease in tire durability.

In FIG. 4 the interrelation of elongation, heat shrinkage and heat generation of polyester cords is shown. From FIG. 3, it has been determined that a heat generation of less than 35 units is necessary for good tire performance. The fabric elongation and heat shrinkage necessary to give low heat generation and hence good tire performance are shown in FIG. 4. It can be seen that there are minimum-maximum limits to elongation and heat shrinkage beyond which the heat generating characteristics of the fabric are undesirable. To be within these limits and have low heat generation, a polyester tire cord fabric must have a minimum elongation of 6.5 percent and a maximum elongation of 9.0 percent with a minimum thermal shrinkage of 2.5 percent and a maximum thermal shrinkage of 5.75 percent.

Heat generation per unit stress cycle, as described herein, was determined as set forth in Measurement of the Dynamic Stretch Modulus and Hysteresis of Tire Cord by W. J. Lyon and Irvin Prettyman, Journal of Applied Physics, vol. 18, No. 6, June 1947. Resonance frequency of the system was maintained at 69 to 71 cycles per second (corresponding to freqeuncy encountered in tire service) by adjustment of the vibrating mass. Then the current was adjusted to maintain strain cycles of 0.5 percent elongation. The equations used in calculating heat generation ($H_L$) are:

$$\eta = k_1 \frac{dV}{Df_0}$$

$$E = k_2 \frac{d}{D} mf_0^2$$

$$H_L = k \frac{Df_0}{3d} E^2$$

In these equations the terms used are defined as:

$\eta$=Polymer intrinsic viscosity
$d$=Yarn density in g./ml.
$V$=Voltage required to maintain amplitude for a constant resistance
$D$=Yarn denier
$f_0$=Resonant frequency of yarn for a given vibrating mass.
$E$=Dynamic modulus of yarn
$m$=Mass of vibrating systems
$H_L$= Heat generation per unit stress cycle per unit sample length.

Elongation and thermal shrinkage are used herein with the meaning given them in Sections 29 and 38 of ASTM Standards on Textile Materials D885–62T (1963, 34th edition).

We believe that a reasonable explanation for the phenomenon encountered in this invention is found in the relation of the physical state of the fiber to its heat history.

The physical properties of any fiber are dependent on not only the chemical composition of the fiber but also its physical state, i.e. the degree of orientation, percent crystallinity, size of crystallites, and the interaction of these factors with temperature.

In the case of polyester fibers, the rate and degree of crystallinity are very sensitive to temperature. The maximum rate of crystallization occurs at a temperature of about 350° F. Nylon, on the other hand, is much less sensitive and crystallizes over a much wider and lower temperature range. In addition, the rate of crystallization of polyester fibers is considerably lower than that of nylon.

Heat treatment of a fiber is desirable to plasticize the amorphous area which allows further crystallization and orientation, particularly where the fiber is under tension.

We have theorized that the use of high temperatures for carefully controlled periods of time is required with polyester for the proper combination of crystallization, crystallize size and orientation. However, when this is done, thermal strains are developed in the fiber. To alleviate these thermal strains, we have found it necessary to allow the fiber to shrink while maintained at a higher temperature than it was initially subjected to.

The invention is covered in the claims which follow. What we claim is:

1. In a process for treating linear alkylene terephthalate polyester cord reinforcement for a tire, said polyester having an intrinsic viscosity in phenol/trichloroethane (60:40) at 30° C. in excess of 0.55, a tenacity in excess of 5.5 grams per denier, and a minimum melting point of 450° F. and wherein the cord is subjected to heat and tension, the improvement of exposing the cord to a first temperature in excess of 440° F. for a period of from 30 to 70 seconds while stretching the cord an amount equal to 2 to 10 percent of the length it had before its exposure to said first temperature, and thereafter exposing the cord to a second temperature at least 10° F. higher than said first temperature for a period of from 30 to 70 seconds while permitting the cord to shrink from 30 to 50 percent of the amount it was stretched while being exposed to said first temperature.

2. In a process as described in claim 1, said first temperature being between 440° F. and 490° F.

3. The process of claim 2, in which the reinforcing material is stretched 5 percent during an exposure time of 53 seconds at a temperature of 460° F. and then is shrunk 2 percent during an exposure time of 53 seconds at a temperature of 470° F.

4. The method of claim 1, wherein the cord after treatment has a thermal shrinkage of from 2.5 to 5.75 percent and an elongation at 2 grams per denier of from 6.5 to 9.0 percent.

References Cited

UNITED STATES PATENTS

| | | | |
|---|---|---|---|
| 2,509,741 | 5/1950 | Miles | 57—157 |
| 2,846,752 | 8/1958 | Lessig | 28—72 |
| 2,932,078 | 4/1960 | Wilson | 28—72 |
| 2,932,901 | 4/1960 | Salem et al. | 34—23 |
| 2,955,345 | 10/1960 | Howe | 28—72 |
| 3,107,140 | 10/1963 | Kurzke et al. | 264—290 |
| 3,481,136 | 12/1969 | Timmons et al. | 264—290 |
| 3,469,001 | 9/1969 | Keefe | 264—290 |
| 2,926,065 | 2/1960 | Coplan | 264—342R |
| 2,955,344 | 10/1960 | Prettyman | 28—72 |
| 2,995,178 | 8/1961 | Saulino et al. | 154—14 |
| 3,051,212 | 8/1962 | Daniels | 264—342R |
| 3,216,187 | 11/1965 | Chantry et al. | 57—140 |
| 3,402,752 | 9/1968 | Beringer | 152—359 |
| 3,413,797 | 12/1968 | Chapman | 264—342R |

JULIUS FROME, Primary Examiner

HERBERT MINTZ, Assistant Examiner

U.S. Cl. X.R.

28—72.17; 57—140, 157; 152—359; 264—235, 342, 346

UNITED STATES PATENT OFFICE
CERTIFICATE OF CORRECTION

Patent No. 3,553,307  Dated  January 5, 1971

Inventor(s)  Frederick J. Kovac et al.

It is certified that error appears in the above-identified patent and that said Letters Patent are hereby corrected as shown below:

Column 4, TABLE I, the last figure "2,282" should read -- 2283 --; same column 4, line 70, "and", second occurrence, should read -- the --. Column 6, line 11, "crystallize" should read -- crystallite --.

Signed and sealed this 21st day of September 1971.

(SEAL)
Attest:

EDWARD M. FLETCHER, JR.  ROBERT GOTTSCHALK
Attesting Officer  Acting Commissioner of Pat

PO-1050
(5/69)

UNITED STATES PATENT OFFICE
CERTIFICATE OF CORRECTION

Patent No. 3,553,307              Dated January 5, 1971

Inventor(s)  Frederick J Kovac and Grover W Rye

It is certified that error appears in the above-identified patent and that said Letters Patent are hereby corrected as shown below:

In Column 5, line 40 of the patent, the equation $$H_L = k \frac{Df\rho}{3d} E^2$$

should be $$H_L = K_3 \frac{Df_o \eta}{dE^2}$$

Signed and sealed this 30th day of April 1974.

(SEAL)
Attest:

EDWARD M. FLETCHER, JR.
Attesting Officer

C. MARSHALL DANN
Commissioner of Patents